United States Patent Office 2,986,544
Patented May 30, 1961

2,986,544

PLASTIC COMPOSITION COMPRISING A MIXTURE OF EMULSIONS OF POLYVINYL ACETATE AND STYRENE-BUTADIENE COPOLYMER

Eugene Joseph Driscoll, Bethesda, Md.
(406 Kent St., Wausau, Wis.)

No Drawing. Filed Oct. 19, 1956, Ser. No. 616,931

2 Claims. (Cl. 260—29.7)

The present invention relates to a composition and more particularly to a basic mixture for formulating a cementitious material which can permanently tape and joint seal tempered and untempered hardboard, plywood, asbestos board, fiber board, compressed fiber board, gypsum board and the like.

An object of this invention is to provide a mixture of synthetic latices having a novel, instant and stable change in viscosity when combined.

Heretofore cementitious materials for use as joint fillers and sealers for board joints, spackling compounds for repairing cracks, caulking compounds for all forms of constructions both interior and exterior work, pipe coverings, wood fillers and other related uses have had some or all of the following deficiencies:

(1) Putrefaction, odor, mold.
(2) Shrinkage.
(3) Delayed shrinkage, causing joint cave in.
(4) Joint ridging and beading.
(5) Weak non-permanent joints.
(6) Cement popping off nail heads.
(7) Several coats of cement over tape required.
(8) Edge cracking of finished joints.
(9) Cement will burn through paint, thus a special primer is needed.
(10) Drying time from approximate 24–48 hours which is undesirable as this long period delays the job.

Accordingly, it is an object of this invention to provide a novel mixture serving as the basic portion for formulation of a cementitious material, which eliminates the above-mentioned deficiencies.

The latices or emulsions in the novel combinations hereinafter described are an acidic synthetic emulsion (hereinafter referred to as latex or emulsion #1) and a basic synthetic emulsion (hereinafter referred to as latex or emulsion #2). They must be air drying to form a continuous or semi-continuous film which is normally solid at ordinary temperatures. The latices must also have the following properties:

(1) Water resistent when dry.
(2) Stable enough to be useable.
(3) Film forming characteristics.
(4) Relatively non-toxic.

Another object of the invention is to provide a cementitious material applicable by standard or customary tools, such as trowels, putty knives or the like, the same being free of the foregoing deficiencies of such prior material and having very strong and durable adhesive properties uneffected by normal ambient conditions, such as moisture, heat and cold.

Another object is to provide a composition formed of ingredients which, when mixed or mingled together, will have good storage life when kept in sealed containers.

Another object is to provide a cementitious mixture that will set hard within a relatively short period of time and with a minimum of shrinkage.

Another object is to provide a cementitious mixture, which bonds efficiently and effectively to various types of joining tapes, and which adheres to the surface applied and is readily adaptable to be painted or coated without changing its physical or chemical properties with primer or the like after it is applied.

Still another object is to provide a novel combination of synthetic emulsions for making a cementitious mixture or the like including, for example, a synthetic latex or emulsion of synthetic resin or polymer having the properties of being mixable with various predetermined quantities of selected fillers. The property of non-precipitation or coagulation of the emulsion, except in very small particles; the property being stable in storage when mixed with fillers and modifiers; the property of forming with fillers and modifiers a hard or semi-hard material by loss of water or the like through evaporation or absorption into the medium on which it is applied; and having the property of formulation with fillers and/or modifiers to provide a cementitious mixture which is trowellable and workable during the application period and does not become hard prematurely.

A further object is to provide a mixture of latices or emulsions with fillers, such as will not absorb large amounts of water; are readily finely divided, such fillers usually being inorganic, and the filler proportions being regulated so as not to precipitate the latex or emulsion or mixture of latices.

A further object is to provide in the mixture of latices a filler having a surface area, such that relatively large amounts can be added to the latex or emulsion, to thereby maintain high solids content in the resulting mixture.

Such fillers, for example, may be marble flour, calcium carbonate, silica flour, titanium dioxide, clay, calcium sulfate, barium sulfate and the like.

A further object is to provide a cementitious material which does not require sanding after application to a surface.

A still additional object and feature is to provide a cementitious mixture having a modifier in the mixture with or without a plasticizer when desirable to obtain a final hardened product susceptible to sanding, such plasticizer when used may be for example—arochlor, dibutylphthalatate, tricresyl phosphate and others.

Yet a further object is to provide a cementitious mix with a modifier having the property of imparting false body (thixotrophy) so that the material will stay where placed, that is will not run, droop or flow in any degree.

A modifier having such properties for example may include, carboxymethyl cellulose, ammonium salts of acrylic acid polymers and others.

Another object is to provide a composition of matter consisting of synthetic resin latices one of which is adapted for use as a modifier for the first, thereby modifying the viscosity, the tack of the resulting adhesive, the shrinkage and the hardness, thereby requiring only a non-hygroscopic filler which does not swell from moisture, adversely gel or precipitate either of the two latices of the composition.

A further object is to provide a novel method of formulation for a cementitious material comprised of synthetic latices and a filler, whereby one latex acts as a thickening agent for the other latex, provides a false body and reduced tack. This phenomena is not clearly understood but a possible explanation is that the relatively smaller particles of the second latex in effect act as small ball bearings between the relatively larger particles of the first latex and thus prevent the latter from sticking or fusing together.

Still a further object is to provide a composition of acid stabilized latex, such as a polyvinyl acetate emulsion in combination with a suitable alkaline stabilized latex, which when combined develops instantly into a highly viscose or gel-like state adapted to become a basic composition for workable material of great stability desirable for use in connection with wallboard joints and taping; spackling compounds for repairing cracked surfaces; caulking around all bathroom tile and ceramic fixtures and equipment; pipe coverings, and as a wood filler and the like.

Still another object is to eliminate in many instances the need for the usual thickening modifiers, such as carboxymethyl cellulose, necessary in most compounds by using a small portion of latex #2 with a major portion of latex #1. When a compound using the combination of these two latices becomes hard or "sets" latex #2 which has been used as a thickening agent is no longer water soluble or effected by moisture as are the usual prior art moisture responsive modifiers for the same uses.

Additional objects and uses of the present invention will become apparent to others skilled in the art from the following detailed description of the invention:

Broadly, this invention relates to a mixture of two synthetic latices, one of which contains a major portion of commercially available polymer emulsion, such as polyvinyl acetate emulsion or equivalent acidic synthetic emulsion and a second basic synthetic emulsion in minor proportions, which mixture of these latices instantly becomes thicker or more viscous than either of the latices alone. This increase in viscosity is of the thixotropic variety. The mixture may be sold in either of two ways: (1) with the filler incorporated therein or (2) as a composition to be subsequently formed into a novel cementitious material by the addition thereto, by the purchaser, of a predetermined grade and quantity of filler, such as marble flour, calcium carbonate, silica flour, titanium dioxide, clay, calcium, sulfate and the like, depending upon the specific use intended for the material. Such uses have been outlined above in this specification.

For example, the polymer emulsions used may be polyvinyl acetate emulsions, such as P.V.A. "Elvacet" emulsion 80-900, 81-900 or 81-1600, described in E. I. Du Pont de Nemours & Company's Vinyl Products Bulletin, V3-355. "Elvacet" 81-900 is a dispersion of polyvinyl acetate in water. It is a viscous, milk-white liquid containing 55%-57% solids and has a viscosity of 800-1000 cps. at ambient temperature (conventionally 25° C.) This grade of "Elvacet" emulsion is used for applications in which high bond strength, high softening point, and excellent pigment binding are required.

"Elvacet" 80-900 is identical with "Elvacet" 81-900 except that the contained resin is of a lower degree of polymerization and has lower bond strength and a lower heat sealing temperature. The contained resin in this grade is more soluble in organic solvents and produces a soft, tacky adhesive with less plasticizer than does "Elvacet" 81-900.

"Elvacet" 81-1600 also contains 55%-57% solids, but the emulsion is of higher initial viscosity, 1500-1700 cps. at ambient temperature (conventionally 25° C.). Upon compounding with plasticizers or solvents such as dibutyl phthalate or carbon tetrachloride, the final compounded viscosity of "Elvacet" 81-1600 is considerably higher than that of "Elvacet" 81-900 or "Elvacet" 80-900 similarly modified.

"ELVACET" EMULSION SPECIFICATIONS

|  | "Elvacet" 80-900 | "Elvacet" 81-900 | "Elvacet" 81-1600 |
|---|---|---|---|
| Percent Solids | 55% min. | 55% min. | 55% min. |
| Brookfield viscosity, cp | 800-1,000 | 800-1,000 | 1,500-1,700 |
| Vinyl acetate monomer | 1.0% max. | 1.0% max. | 1.0% max. |
|  | 4-6. | 4-6. | 4-6. |

For example, the second latex used may be any of the styrene latex or styrene-butadiene emulsion polymers described in the pamphlet, entitled "Tech-Book Facts," of the Goodyear Tire and Rubber Company's chemical division, Goodyear latex-types and properties under the trade name "Pliolite" (styrene) latex.

PLIOLITE (RESIN) LATICES

| Property | 101A | 102 | 160 | 165 | 170 | 150 |
|---|---|---|---|---|---|---|
| Polymer Type and Monomer Ratio. | Butadiene-Styrene, 45/55. | Butadiene-Styrene, 40/60. | Butadiene-Styrene, 33/67. | Butadiene-Styrene, 33/67. | Butadiene-Styrene, 30/70. | Butadiene-Styrene, 14/86. |
| Total Solids, percent | 56 | 48 | 49 | 48 | 35 | 35. |
| Stabilizer | Ammonium Soap. | Synthetic Nonionic. | Synthetic Anionic. | Synthetic Nonionic. | Ammonium Soap. | Ammonium Soap. |
| Antioxident | Non-Staining | None | None | None | Non-Staining | None. |
| pH | 10.0 | 10.0 | 10.0 | 10.5 | 9.5 | 10.0. |
| Average Particle Size, Angstroms. | 4,000 | 2,000 | 2,000 | 2,500 | 1,000 | 1,000. |
| SP. gr. of Latex Solids | 0.98 | 1.00 | 1.01 | 1.01 | 1.02 | 1.04. |
| Solids, lbs./gal | 4.6 | 4.0 | 4.1 | 4.0 | 2.9 | 3.0. |
| Latex, lbs./Gal | 8.2 | 8.3 | 8.3 | 8.4 | 8.4 | 8.5. |
| Viscosity, cps. v at 25° C. | 100 | 25 | 75 | 25 | 15 | 15. |
| Surface Tension, Dynes/cm. | 35 | 35 | 35 | 35 | 35 | 35. |
| Mechanical Stability | Very Good | Excellent | Excellent | Excellent | Very Good | Very Good. |
| Storage Stability | do | do | do | do | do | Do. |
| Acid and Salt Ion Tolerance. | Below Average | Above Average | Average | Above Average | Below Average | Below Average. |
| Film Properties | Soft, slightly tacky. | Soft, flexible | Flexible | Flexible | Slightly less flexible than 160 or 165. | Not film-forming, below 350° F. |

The polyvinyl acetate emulsions have high adhesive properties and, in general, are acid stabilized milky white liquids of creamy or watery consistency with a pH of about 4-6, and a viscosity of 800-1000 or 1500 centipoises at 25° C., while the styrene-butadiene emulsion polymers, for examples, Goodyear's "Pliolite" (resin) latices are similar in appearance, but are alkaline stabilized with a pH of from about 9 to 10 and a viscosity of from 15 to 100 centipoises at 25° C., as per chart.

In the practice of the present invention, it is desirable to first mix, for example, a major quantity of P.V.A. emulsion, such as Du Pont Elvacet 80-900; 81-900 or 81-1600 with a relatively minor quantity of modifier, such as pure styrene emulsion or of "Pliolite," styrene-butadiene emulsion, such as Pliolite 101A, 102, 160, 165, 170 or 150 to provide in itself a gel-like mixture as a composition of matter having great stability, and having the property of forming a trowellable cementitious material when subsequently mixed with a predetermined quantity of water and a predetermined grade and amount of filler, according to the following examples:

EXAMPLE I

*Broad example (basic emulsion mix)*

|  | Parts by weight |
|---|---|
| P.V.A. emulsion | 150 to 180 |
| Modifier | 20 to 50 |
| Water (added) | 100 to 120 |
| Inorganic filler | 400 to 700 |

EXAMPLE II

*Broad example (emulsion mix plus water and filler)*

| | Parts by weight |
|---|---|
| P.V.A. emulsion | 150 to 180 |
| Modifier | 20 to 50 |
| Water (added) | 100 to 120 |
| Filler | 400 to 700 |

EXAMPLE III

| | |
|---|---|
| P.V.A. emulsion | 160 to 180 |
| Styrene-butadiene emulsion | 30 to 40 |
| Water | 100 to 120 |
| Inorganic filler (80 × 140 mesh) | 500 to 700 |

EXAMPLE IV

| | |
|---|---|
| P.V.A. emulsion (du Pont, Elvacet #80–900) | 180 |
| Styrene-butadiene emulsion (Goodyear Pliolite) #102 | 30 |
| Water | 120 |
| Marble flour | 700 |

EXAMPLE V

| | |
|---|---|
| Elvacet #81–900 | 160 |
| Pliolite #150 | 40 |
| Water | 120 |
| Silica flour | 500 |

EXAMPLE VI

| | |
|---|---|
| Elvacet #81–1600 | 170 |
| Pliolite #170 | 40 |
| Water | 120 |
| Calcium carbonate (pulverized) | 600 |

Other fillers such as titanium dioxide, clay, calcium, or barium sulfate may be used.

EXAMPLE VII

| | Parts by weight |
|---|---|
| P.V.A. emulsion | 170 |
| Butadiene-styrene emulsion 33/67 | 30 |
| Water | 120 |
| Marble flour | 700 |

EXAMPLE VIII

| | |
|---|---|
| P.V.A. emulsion (Elvacet 81–1600) | 180 |
| Butadiene-acrylonitrile 33/67 | 40 |
| Water | 120 |
| Marble flour | 700 |

EXAMPLE IX

| | |
|---|---|
| P.V.A. emulsion (Elvacet 80–900) | 160 to 170 |
| Pliolite #101A | 30 to 40 |
| Water | 120 |
| Marble flour | 500 to 700 |

EXAMPLE X

| | |
|---|---|
| P.V.A. emulsion (Elvacet #81–1600) | 160 to 170 |
| Pliolite #102 | 20 to 40 |
| Water | 110 to 130 |
| Marble flour | 500 to 700 |

EXAMPLE XI

| | |
|---|---|
| P.V.A. emulsion (Elvacet #81–900) | 160 to 170 |
| Pliolite #160 | 30 to 40 |
| Water | 110 to 130 |
| Filler (marble flour) | 500 to 700 |

EXAMPLE XII

| | |
|---|---|
| P.V.A. emulsion (Elvacet #80–900; 81–1600 or 81–900) | 160 to 170 |
| Pliolite #150 | 30 to 40 |
| Water | 110 to 130 |
| Marble flour (80 ×140 mesh) | 500 to 700 |

As the butadiene content is decreased, the copolymer progresses from rubbery to resinous in nature and usually it has been found preferable to use resin latices rather than rubber latices for the most efficient results when combining with polyvinyl acetate, water emulsions, such as Du Pont "Elvacet" 80–900; 81–900 or 81–1600. For example, when using Goodyear "Pliolite latex," the 100 series resin type, high in styrene content is used. Also in some instances for special uses the following examples may be preferable:

EXAMPLE XIII

| | Parts by weight |
|---|---|
| P.V.A. emulsion | 120 to 190 |
| Styrene polymer emulsion | 30 to 40 |
| Water | 120 |
| Filler, such as marble flour, having a particle size of 50–200 mesh | 400 to 700 |

EXAMPLE XIV

| | |
|---|---|
| P.V.A. emulsion | 170 |
| Acrylic polymer emulsion | 40 |
| Water | 120 |
| Filler (inorganic) | 600 |

Thus other polymer emulsions such as styrene and acrylic may be used in lieu of styrene-butadiene emulsions, depending upon the use intended. Also any of the above "Elvacet" emulsions may be used in alternate combinations with the various above "Pliolite" emulsions.

The examples, as cited above, should not be considered as in any way limiting the scope of the invention but are merely given so that those skilled in the art may better understand the invention.

Also, the cementitious material may be changed for certain uses by maintaining fixed proportions of the latices and varying the proportions respectively of the water and/or filler.

When the two latices are stirred together the resulting mixture becomes thixotropic or gel-like and develops a pronounced resistance to flow. This mixture now provides the body or basis for the formulation of the cementitious material by the addition of water and filler as set forth in the above examples.

The combining action of such latices is efficiently effective for the purposes of the present invention without the use of prior art modifiers, plasticizers or the like. For example, the P.V.A. provides a combination of matter having binding and adhesive properties, the "Pliolite" acts as a modifier for the P.V.A., that is as a modifier of apparent viscosity, a modifier of the shrinkage and the hardness of the composition, which properties remain stable when a filler is subsequently added, said filler being such as not to be swelled by water and which does not adversely gel or precipitate either of the two combined latices.

The filler used should be of such a degree of fineness as to provide the best trowelling results upon application to a surface, such as for example of an 80 x 140 mesh screen size. The proper amount and the proper fineness of the filler will eliminate sanding of a surface or of the cementitious material when applied to the surface.

Enough water is used in formulating the cementitious material to give in combination with the filler the desired characteristics of spreading and speed of cure or gelation on a surface and the P.V.A. content of the composition provides adhesion to a surface and sets or cures by evaporation from the surface and by absorption of the water into the surface to which it is applied.

The following is offered as a possible theory for what happens when the latices are stirred together. It is believed that latex #1 which is an acidic synthetic emulsion acts as a precipitating agent for latex #2 which is a basic synthetic emulsion and probably alkaline stabilized. This precipitation of latex #2 into very small particle sizes and permits them to act as a false body and to prevent the relatively larger particles of latex #1 from sticking together. These smaller particles of latex #2 in effect act as small ball bearings between the larger particles of latex #1. The particles of latex #2 once so precipitated are stable and not soluble in the film of moisture which is around the larger particles of latex #1 as a result of the combination of the two respective latex particles. Thus mixing the two latices probably develops a mechanical stable linking thereof together, such mixing causing the basic synthetic emulsion to be precipitated and distributed uniformly throughout the acidic synthetic emulsion. It is not intended to limit the scope of the invention in any way by the citing of the possible theory as outlined in this paragraph.

The "Pliolite" once precipitated is no longer water soluble, that is, no longer effected by moisture. The advantage of this combination of latices is to eliminate in many instances the need for the usual thickening modifiers, such as carboxyol methyl cellulose, sodium, ammonium salts of acrylic acid polymers and others necessary in most compounds by using a small portion of latex #2 with a major portion of latex #1.

To actually mix a cementitious material the steps are as follows:

(1) Mix P.V.A. and a polymer styrene emulsion or "Pliolite" in a container, until the mixture becomes very much thicker with a pronounced resistance to flow;

(2) Pour in water to make mixing easy and to control the amount of solid or filler to be added subsequently;

(3) Mix in marble flour (calcium carbonate) for solids, which solids control the thixotropic condition or false body set up by the mixture of the two latices;

(4) Add more solid or filler, until slump test on the material stands in a peak and will not flow or droop. This then indicates the proper trowel on characteristic has been obtained.

The above mixing is done while carefully measuring the respective quantities of the ingredients used as set forth in the foregoing examples.

Thus there is provided, a composition of matter formulated from two latices, which by their nature combine to form a mixture having false body and which may be used as a basic composition to produce various cementitious materials which may be used for wallboard construction and finishing after taping, and for joint and crack fillers on all types of construction and materials and the like, and which, if used alone, will provide a binding and an adhesive substance for many uses.

SPECIFIC EXAMPLE OF USE AND ACTUAL PRACTICE

The use of wallboards of various types, in lieu of plaster, has increased greatly since World War II in commercial, industrial and home construction. This has resulted in one of the major uses of the present invention.

Since most of the wallboards used are in multiple lengths and usually 4' wide, it is necessary to treat the joints which occur, with a system that will make them imperceptible. Thus one of the important uses of the present composition is to treat such joints and any of the foregoing examples from I to XIV may be used depending upon the surface or type of wallboard. Thus in actual practice, Example VI may be selected as given above and applied by trowelling or the like. The wallboards are attached to the framing members with an approved nail. The nail is dimpled slightly below the surface to provide a pocket in which this cement is used to cover nail heads and fill pocket flush with wallboard. Specifically, the joints which occur when two pieces of wall board abut each other are treated in the following manner with the present novel cementitious composition:

(1) *Buttering the joint.*—A 5" broad knife is used to butter the cement into the channel formed by the abutting edges of the wallboard. The cement is applied over the edges with a broad knife about 2" out from each edge of the wallboard.

(2) *Embedding the tape.*—Center reinforcement tape is forced down into the channel by holding broad knife almost vertical to the wallboard and drawing along joint with sufficient pressure to remove excess cement.

(3) *Covering the tape.*—As soon as tape is embedded, cover it with a thin layer of cement sufficiently wide to flush the edges of tape with wallboard. At this time, apply a covering coat of cement over all nail heads, using sufficient pressure on the knife to finish cement level with wall surface.

(4) *Second coat.*—After embedding coat has dried (usually 2 hours) cover joints and nail heads with second coat of cement, feathering edges of cement an inch or two beyond edges of first cement coat. A trowel may also be used for this application.

(5) *Final coat.*—When the second coat has dried, which usually is in one hour, because of the novel action resulting from the several ranges and proportions of the ingredients in the above given examples, such as the #VI example selected; all joints are checked for slight scratches. These scratches occur in some instances when a slightly rough surfaced tool is used. These scratches are then filled with an additional amount of the novel cementitious material or cement of the particular example selected and the edges are wiped clean with a smooth surfaced broad knife. Then after thorough drying of the final coat, the wallboard is ready for decoration as desired.

Without further detailed description, it is believed that the foregoing invention is now sufficiently clear to others skilled in the art to practice the same and that the factual results and any theory relating to the actual results developed from the various mixtures of the ingredients are described adequately and in accord with the requirements of the patent statutes. It is to be expressly understood, however, that various changes in ingredients and in combinations thereof which may be made by others skilled in the art after the teachings of the present invention are intended to be covered by this invention and to determine the scope of the same reference should be had to the appended claims.

What is claimed is:

1. Pressure deformable wet plastic sealing composition comprising from about 150 to 180 parts by weight of an emulsion of polyvinyl acetate in water having a viscosity of about 800 to 1700 cps. at ambient temperature and containing about from 55 to 57% by weight of solids having a substantially acid pH in the range of about 4 to 6, blended with about from 20 to 50 parts by weight of an emulsion of a copolymer of styrene and butadiene having a viscosity in the range of about 15 to 100 cps. at ambient temperature, about 35 to 56% by weight of solids and a substantially alkaline pH, the emulsion blend further having added thereto about from 100 to 120 parts by weight of water.

2. The composition defined in claim 1 further containing as a filler material about 400 to 700 parts by weight of finely divided dry solids homogeneously distributed therein.

References Cited in the file of this patent

UNITED STATES PATENTS

| 2,614,093 | Wheelock | Oct. 14, 1952 |
| 2,624,683 | Bezman | Jan. 6, 1953 |
| 2,626,936 | Hahn | Jan. 27, 1953 |
| 2,629,702 | Snyder | Feb. 24, 1953 |
| 2,656,327 | Van Wirt et al. | Oct. 20, 1953 |
| 2,709,689 | Herzog | May 31, 1955 |
| 2,807,597 | Sonnenfeld et al. | Sept. 24, 1957 |

FOREIGN PATENTS

| 1,019,640 | France | Nov. 5, 1952 |

OTHER REFERENCES

Sutheim, G.: "Introduction to Emulsions," Chemical Publishing Company (1946), page 163.